2,778,779

REMOVAL OF ARSENIC IN HYDROCARBON OILS BY USE OF A READILY REDUCIBLE METAL OXIDE AND WATER

George R. Donaldson, Riverside, Ill., assignor to Universal Oil Products Company, Chicago, Ill., a corporation of Delaware No Drawing. Application June 14, 1952,
Serial No. 293,654

12 Claims. (Cl. 196—50)

This invention relates to a catalytic conversion process and more particularly to a conversion process effected in the presence of a catalyst comprising alumina and a noble metal.

Recent developments in the field of reforming of gasoline in order to improve the antiknock characteristics of the gasoline and to the production of aromatic hydrocarbons are directed to the use of a catalyst comprising alumina and platinum. For the hydrocarbon conversion reactions it appears that alumina offers particular advantages in combination with a noble metal and particularly platinum. The association of alumina and platinum catalyzes the reactions desired in reforming operations to a greater extent than heretofore obtainable, with a minimum of undesired side reactions. The reactions desired in reforming operations include dehydrogenation of naphthenes to aromatics, dehydrocyclization of paraffins to aromatics, isomerization of alkyl-naphthenes containing 5 carbon rings to naphthenes containing 6 carbon rings and dehydrogenation to aromatics, isomerization of straight chain or slightly branched chain paraffins to more highly branched chain paraffins, controlled cracking or splitting of carbon to carbon bonds, desulfurization, etc. In the dehydrogenation operations to produce aromatics, the desired reactions include the dehydrogenation, dehydrocyclization and naphthene isomerization reactions set forth above.

As hereinbefore set forth, the combination of alumina and a noble metal and particularly platinum is especially active for effecting the desired reactions with a minimum of undesired side reactions. This catalyst appears peculiarly effective in the treatment of charge stocks comprising hydrocarbons and thus offers particular advantages for use in the conversion of hydrocarbons.

In the conversion of hydrocarbons, it now has been found that certain hydrocarbon charging stocks contain certain impurities which rapidly deactivate the alumina-platinum catalyst and render the same inactive for catalyzing the desired reactions as hereinbefore set forth. These impurities are present in hydrocarbon charge stocks in very minute quantities and, therefore, would not be expected to exert any substantial deactivating effect on the catalyst. Surprisingly, certain of these impurities, even in the very minute concentrations as are present in the hydrocarbon charge stocks, do rapidly deactivate the alumina-platinum catalyst and, therefore, render the process inoperable for the intended purpose. In accordance with the present invention, the charge stock is treated in order to remove the harmful impurities or to reduce the content thereof to a concentration at which the deleterious effects are substantially minimized.

In one embodiment the present invention relates to a conversion process effected in the presence of a catalyst comprising alumina and a noble metal, which comprises treating an impurity-containing charge with a readily reducible metal oxide, separating therefrom a charge fraction having an impurity content of less than about 0.05 parts per million and less than that of said charge subjecting said charge fraction to conversion in the presence of a catalyst comprising alumina and a noble metal.

In another embodiment the present invention relates to a hydrocarbon conversion process which comprises treating an arsenic-containing hydrocarbon charge with a readily reducible metal oxide in the presence of water, thereby oxidizing said arsenic into a compound soluble in water, dissolving said arsenic compound in the water and removing the same from the process, separating a hydrocarbon charge fraction having an arsenic content of less than about 0.05 parts per million and less than that of said charge, and subjecting said hydrocarbon fraction to conversion in the presence of a catalyst comprising alumina and platinum.

In a specific embodiment the present invention relates to a process for producing reformed gasoline from an arsenic-containing hydrocarbon charge which comprises treating the charge with ferric oxide in the presence of water, thereby oxidizing the arsenic into a form soluble in water, dissolving the oxidized arsenic compound in water and removing the same from the process, separating a gasoline fraction having an arsenic content of less than about 0.015 parts per million and less than that of said charge, and reforming said gasoline fraction in the presence of a catalyst comprising alumina, platinum and combined halogen.

As will be noted from the embodiments, an arsenic-containing hydrocarbon charge is treated to lower the arsenic content to less than about 0.05 parts per million. Preferably the arsenic content is reduced to below about 0.015 parts per million. As hereinbefore set forth and as will be shown in the following examples, the presence of arsenic in concentrations of greater than even the minute quantities of 0.05 parts per million rapidly deactivates the alumina-platinum catalyst. While it is believed that arsenic is the most harmful impurity, other undesirable impurities having a deleterious effect on the catalyst include molybdenum, antimony, nickel, cadmium and lead. It is understood that these impurities may be present as the element or probably as one or more compounds thereof, and that reference to the element in the present specifications and claims is intended to include the free element and/or compounds thereof. This method of referring to the element is justified because it appears that the element is the harmful component and that, when present as a specific compound, the compound may decompose and other compounds of the element may be formed during the conversion reaction. For example, it is believed that arsenic deactivates the catalyst by forming a platinum arsenide or other compound of platinum and arsenic. Although arsenic is considered as a non-metal by some authorities, it resembles the metals in a number of respects and, in view of the fact that the other impurities hereinbefore set forth are metals, it is understood that reference to metallic impurities or similar phraseology is intended to include arsenic along with the other impurities as set forth above, and that removal of these metallic impurities below 0.05 parts per million means that the treated charge does not contain any one of these impurities in a concentration above 0.05 parts per million, although the sum total of the impurities may be above 0.05 parts per million.

As hereinbefore set forth, the novel features of the present invention are directed to catalysts comprising alumina and a noble metal. Platinum is a preferred noble metal for use in accordance with the present invention. Other noble metals include palladium, silver, gold, ruthenium, rhodium, osmium, iridium, etc., with the understanding that these catalysts are not necessarily equivalent. The platinum preferably is utilized in the catalyst in a concentration of from about 0.01% to about 1% by weight of the final catalyst, although it is understood that lower or higher concentrations of platinum, which generally will not be above about 10%, may be employed.

As hereinbefore set forth, the catalyst contains alumina. In one embodiment the alumina comprises a major proportion of the catalyst and may comprise, for example, over 95% by weight of the catalyst. In another embodiment, the catalyst may include alumina as well as other inorganic oxides as, for example, oxides of silicon, magnesium, zirconium, thorium, vanadium, titanium, boron, etc., or mixtures thereof, and the alumina, moreover, may comprise a minor proportion of the catalyst. For example, one catalyst may comprise silica-alumina-platinum and in one embodiment the silica may comprise from about 70% to about 95% and the alumina may comprise from about 5% to about 30% by weight of the mixture.

It is understood that the alumina and other inorganic oxides are porous, and reference to alumina in the present specifications and claims is intended to refer to porous alumina, including gamma-alumina, and not to include non-porous aluminas as a component of the catalyst in a substantial amount.

In a preferred embodiment the alumina-platinum catalyst also contains a halogen. The halogen may be in a concentration of from about 0.01% to about 8% by weight of the final catalyst, although higher or lower concentrations may be employed. The halogen is believed to be present in combined form, and the halogen preferably comprises combined fluorine which advantageously is present in a concentration of from about 0.01% to about 3% by weight of the catalyst. The combined chlorine generally is present in a concentration of from about 0.1% to about 8% by weight of the catalyst. The combined bromine and combined iodine generally are not as preferable but may be employed, when desired, in a concentration of from about 0.01% to about 8% by weight of the catalyst. It is understood that the various halogens which may be employed are not necessarily equivalent and also that the combined halogen content of the catalyst may comprise a mixture of two or more of the halogens, in which case the total halogen concentration preferably comprises from about 0.01% to about 8% by weight of the catalyst.

As hereinbefore set forth, charge stocks containing arsenic are treated with a reducible metal oxide to separate a charge fraction having an arsenic content of below about 0.05 parts per million and preferably below about 0.015 parts per million. Any suitable readily reducible metal oxide may be employed, the metal oxide preferably being utilized in a highly oxidized state. Although not with the intention of being limited thereto, applicant offers the explanation that the metal oxide in part releases oxygen to oxidize the arsenic. The oxidized arsenic is more readily soluble in water than the arsenic originally contained in the hydrocarbon charge. The oxidized arsenic compound is then dissolved in water and thereby is removed from the hydrocarbon charge, thus separating a treated hydrocarbon charge substantially reduced in arsenic content.

Preferred readily reducible metal oxides includes those of iron, nickel, cobalt, copper, tungsten, vanadium, molybdenum, chromium, and mixtures thereof. Preferred oxides of these metals include the ferric oxides ($Fe_2O_3$, $Fe_3O_4$), nickelic oxides ($Ni_2O_3$, $Ni_3O_4$), cobaltic oxides ($Co_2O_3$, $Co_3O_4$), cupric oxide ($CuO$), tungsten oxide ($WO_3$), vanadium poly oxides ($V_2O_3$, $V_2O_4$, $V_2O_5$), molybdenum oxides ($Mo_2O_3$, $MoO_3$), chromium oxides ($Cr_2O_3$, $CrO_3$), and mixtures thereof.

The readily reducible metal oxide may be employed as such or may be composited with a suitable carrying material. Satisfactory carrying materials include silica, alumina, aluminum silicates, kieselguhr, manganese, zirconia, etc. The readily reducible metal oxide generally will comprise from about 5% to 60% or more by weight of the carrying material.

In one method of operation, the readily reducible metal oxide and water may be disposed in a suitable zone and the hydrocarbon charge stock is passed therein. Preferably provisions are made so that the hydrocarbon, water and reducible metal oxide are intimately contacted in order to assure reaction of the arsenic compounds with the readily reducible metal oxide and dissolving of the oxidized arsenic compound in the water. The mixed products are allowed to settle in either the same or different zones in order to separate a hydrocarbon phase and a water phase. The water phase is separately withdrawn and may be removed from the process. The hydrocarbon phase is separately withdrawn and will be substantially reduced in arsenic content.

In another method of operation, the readily reducible oxide may be disposed as a fixed bed in a suitable zone and the hydrocarbon charge stock is passed therethrough in either upward or downward flow. In one embodiment, water may be charged with the hydrocarbon charge or introduced separately into the treating zone, and the products are subsequently separated into a water phase containing arsenic compounds and a treated hydrocarbon phase substantially reduced in arsenic content. In another method, the effluent hydrocarbon phase is contacted with water in a separate zone to thereby dissolve the arsenic compounds in the water and to separate a treated hydrocarbon fraction substantially reduced in arsenic content.

The treatment of the hydrocarbon charge with the readily reducible metal oxide may be effected at any suitable temperature. In general, the temperature to be employed will be below about 700° F., and preferably is within the range of from about atmospheric to 500° F. The pressure to be employed will depend upon the particular type of operation to be utilized and may range from atmospheric to 1000 pounds or more per square inch.

As hereinbefore set forth, it is belived that the metal oxide releases a portion of its oxygen to convert the arsenic present in the charging stock into an oxidized form which is more readily soluble in water. In releasing this oxygen, the metal oxide is converted into a lower valence state. In one embodiment of the invention, the process may be interrupted periodically and the metal oxide may be re-oxidized to the more highly valent state. In another embodiment, the treating agent may be transferred, either continuously or intermittently, to another zone and therein subjected to oxidation treatment. The oxidation may be effected in any suitable manner including, for example, air blowing at a temperature of from atmospheric to 700° F. or more and generally at a temperature of from about 100° to about 600° F. It generally is preferred, before subjecting the metal oxide to oxidation, to purge the treating agent of entrained hydrocarbons and this may be accomplished in any suitable manner. In one method, an inert gas, such as nitrogen, flue gas, etc., may be used to strip entrained hydrocarbons from the treating reagent prior to air blowing. The purging treatment is preferably effected at an elevated temperature which may range from 100° to 800° F. or more. In one embodiment of the invention, the purging treatment may be effected at an elevated temperature of from about 400° to about 800° F. and the subsequent air blowing may be effected with air at room temperature. This will serve to reduce the temperature of the treating agent to that desired for the process cycle and at the same time will take advantage of the retained heat in the treating reagent to effect the oxidation at an elevated temperature. After the oxidation treatment is completed, the reagent may be purged again to strip out entrained air if it is so desired. In another embodiment, air or other suitable oxygen-containing gas may be introduced along with the hydrocarbon charge stock or separately introduced into the reaction chamber in order to effect oxidation of the metal oxide simultaneously with the reduction thereof.

In still another embodiment of the invention, the readily reducible metal oxide may be utilized as a slurry in the hydrocarbon charge stock and/or water and introduced in this manner into a suitable reaction zone. In still another embodiment, the reducible metal oxide may be carried into the reaction zone in the hydrocarbon charge stock, water and/or other suitable carrying medium, and the mixture maintained in the treating zone in a fluidized state under hindered settling conditions.

As hereinbefore set forth, the novel features of the present invention are particularly applicable to the treatment of a gasoline fraction to be subjected to reforming. It is understood that the gasoline fraction may comprise a full boiling range gasoline having an end boiling point of from about 400° to about 430° F., or any selected fraction thereof and that it may include components boiling above the gasoline range, thus having an end boiling point up to 500° F. or more. The hydrocarbon fraction preferably comprises a substantially saturated hydrocarbon distillate, including straight run gasoline, natural gasoline, etc., or mixtures thereof. In some cases it may comprise an unsaturated distillate, including cracked gasoline, as well as mixtures of the unsaturated gasoline and saturated gasoline. The reforming operation is effected at a temperature of from about 600° to about 1000° F. or more, a pressure of from about atmospheric to 1000 pounds per square inch or more, and a weight hourly space velocity from about 0.1 to 10 or more. The weight hourly space velocity is defined as the weight of oil per hour per weight of catalyst in the reaction zone. In one embodiment, the reforming is effected in the presence of hydrogen and, in this embodiment, the hydrogen produced in the process preferably is recycled for further use therein. The concentration of hydrogen to hydrocarbon in the reaction zone generally will be in a molar ratio of from about 0.1:1 to about 10:1 or more. When the hydrogen gas to be recycled contains hydrogen sulfide or other impurities, it is within the scope of the invention to treat the recycle gas to remove the impurities before reusing the gas in the process.

In another preferred embodiment, the novel features of the present invention are particularly applicable to the conversion of naphthenes into aromatics as hereinbefore set forth. Generally the charge in this embodiment will comprise a selected hydrocarbon distillate which, in one embodiment, may have a boiling range of from about 140° to about 280° F. The conditions of operation used in this embodiment are substantially the same as those hereinbefore set forth except that the temperature to be employed preferably is within the range of from about 800° to 1000° F. or more.

While the process of the present invention is particularly applicable to the reforming or aromatization reactions hereinbefore set forth, it is understood that the novel features may be employed in any process in which a catalyst comprising alumina and a noble metal and particularly plantinum is used. Representative processes include dehydrogenation of normally gaseous aliphatic hydrocarbons, such as ethene, propane and/or butane to the corresponding olefins, dehydrogenation of monoolefins to diolefins, destructive hydrogenation or hydrocracking reactions in which a hydrocarbon and particularly oil heavier than gasoline is subjected to conversion to produce lower boiling products and particularly gasoline, non-destructive hydrogenation reactions, including hydrogenation of unsaturated aliphatic compounds, such as monoolefins, diolefins, etc. to form the corresponding saturated hydrocarbons, hydrogenation of unsaturated cyclic hydrocarbons, hydrogenation of unsaturated alcohols, ketones, acids, etc., oxidation of olefins to form the corresponding oxides, such as the oxidation of ethylene to ethylene oxide, propylene to propylene oxide, etc., oxidation of alcohols, ketones, etc. The conditions of operation to be employed will depend upon the particular reaction to be effected. Thus, for non-destructive hydrogenation reactions, the temperature may range from atmospheric to 500° F. or more, the pressure from about 10 to about 2000 pounds or more, and the weight hourly space velocity of from about 0.1 to 10 or more.

The conversion reactions mentioned above may be effected in any suitable manner. The reforming process thus may be effected in the fixed bed, slurry type, moving bed or fluidized type process.

The following examples are introduced to illustrate further the novelty and utility of the present invention but not with the intention of unduly limiting the same.

*Example I*

To a catalyst comprising alumina, about 0.3% by weight of platinum and about 0.2% by weight of combined fluorine, arsenic was added in a concentration of 0.0025 gram atoms per 50 grams of catalyst. The arsenic was added as arsenic pentoxide in ammoniacal solution by dissolving the required amount in 50 ml. of water and pouring over 50 grams of the catalyst. The catalyst was allowed to stand for one-half hour, then was dried on a water bath and finally calcined for 3 hours in a muffle furnace at 932° F.

The catalysts in this example were utilized for the aromatization of a Mid-Continent naphtha having an A. P. I. gravity at 60° F. of 52.7, an aromatic content of 8.8% and a boiling range of 229° to 387° F. The aromatization was effected at a temperature of 977° F., a superatmospheric pressure of 300 pounds per square inch and a hydrogen to hydrocarbon molar ratio of 1.75:1.

Catalyst A comprised the alumina-platinum-halogen composite as described above but not containing the arsenic. Catalyst B comprised the catalyst containing the arsenic as described above.

In the aromatization runs, catalyst A produced an average of 48.3% by weight of aromatics. In contrast, catalyst B under the same conditions produced only 23.6% by weight of aromatics. It thus will be noted that the arsenic reduced the aromatization activity of the catalyst to less than half of the catalyst not containing arsenic.

*Example II*

Other catalysts were prepared in a similar manner as described in Example I but contained 0.0025 gram atoms of molybdenum, antimony, nickel, cadmium and lead. These catalysts when utilized under the same conditions as described in Example I produced the following yields of aromatics.

TABLE

| Added component: | Percent aromatics |
|---|---|
| None | 48.3 |
| Molybdenum | 24.5 |
| Antimony | 30.0 |
| Nickel | 30.2 |
| Cadmium | 30.7 |
| Lead | 33.5 |

Here again it will be noted that catalysts containing as low as 0.0025 gram atoms of the various impurities considerably reduced the aromatization activity of the catalysts.

*Example III*

In a commercial reforming process utilizing a catalyst as described in Example I and charging approximately 1200 barrels per day of a Mid-Continent naphtha, the activity of the catalyst decreased rapidly. The naphtha had an A. P. I. gravity of about 53.0, a boiling range of from 210° to 428° F. and contained approximately 6.8% by weight of aromatics. It was found that the naphtha being charged to this unit contained approximately 0.16 parts per million of arsenic.

As hereinbefore set forth, one of the desired reactions in reforming operations is dehydrogenation of the naphthenes to aromatics. This dehydrogenation is highly endothermic and, therefore, results in a comparatively large temperature differential between the inlet and outlet of a reaction zone maintained under adiabatic conditions. This temperature differential is indicative of the dehydrogenation activity of the catalyst. In this process, the naphtha was introduced into the reaction zone at a temperature of approximately 900° F. and in normal operations a temperature drop of above about 50 degrees indicates that satisfactory dehydrogenation is obtained. However, because of the arsenic content of the naphtha, the temperature differential between the inlet and outlet of the reaction zone on the first day was 53° F. but after 11 days of operation it dropped to 17° F. It readily is apparent that this small temperature differential indicates substantial loss in the dehydrogenation activity of the catalyst.

As measured in octane number, the operation in which the temperature differential between the inlet and outlet of the reaction zone was above about 50° F. resulted in a reformate having an F-1+3 cc. of tetraethyl lead octane number of 92. In contrast, under the same conditions of operation but utilizing the catalyst deactivated by arsenic-containing impurities, in which the temperature differential between the inlet and outlet of the reactions zone was only 17° F., the F-1+3 cc. of tetraethyl lead octane number was only 72.4. The F-1+3 cc. of lead octane number of the charge fraction was 66.5. Thus it is seen that the temperature differential in the reaction zone is a measure of the activity of the catalyst.

*Example IV*

600 grams of a straight run naphtha having an arsenic content of about 0.78 parts per million were intimately stirred at room temperature with 300 grams of distilled water and 30 grams of ferric oxide ($Fe_2O_3$). The mixing was continued for 30 minutes and the liquid products were separated from the solid particles by filtration. Subsequently, the hydrocarbon phase was separated from the water phase. The hydrocarbon phase contained 0.001 parts per million of arsenic.

*Example V*

Straight run gasoline containing 0.5 parts per million of arsenic may be treated by being passed through a bed of nickelic oxide ($Ni_2O_3$) at 250° F. The hydrocarbon fraction is withdrawn from the treating zone and then is washed with water. The water will dissolve the oxidized arsenic compounds. The hydrocarbons are separated from the water, and the hydrocarbon thus treated will be substantially reduced in arsenic.

In this process, two zones containing the treating agent are employed. After the nickelic oxide has been substantially reduced, treatment of the straight run gasoline in one zone is discontinued, and the treating agent is reoxidized by passing air therethrough. Prior to passing the air therethrough, the bed of treating reagent is purged with nitrogen gas at 600° F. The air is introduced into the treating zone at room temperature and is followed by a purge with nitrogen gas introduced at room temperature. The final purge will serve to reduce the temperature of the treating agent to approximately 250° F., at which treatment the processing cycle may again be started.

I claim as my invention:

1. The method of converting an arsenic-containing hydrocarbon charge which comprises treating the charge with a readily reducible metal oxide, thereby oxidizing the arsenic into an oxidized compound soluble in water, dissolving said oxidized compound in water and removing the same from the process, separating a hydrocarbon charge fraction having an arsenic content of less than about 0.05 parts per million and less than that of said charge, and subjecting said hydrocarbon fraction to conversion in the presence of a catalyst comprising alumina and platinum.

2. A hydrocarbon process which comprises treating an arsenic-containing hydrocarbon charge with a readily reducible metal oxide in the presence of water, thereby oxidizing said arsenic into a compound soluble in water, dissolving said arsenic compound in the water and removing the same from the process, separating a hydrocarbon charge fraction having an arsenic content of less than about 0.05 part per million and less than that of said charge, and subjecting said hydrocarbon fraction to conversion in the presence of a catalyst comprising alumina and platinum.

3. The process of producing reformed gasoline from an arsenic-containing hydrocarbon charge which comprises treating the charge with a readily reducible metal oxide and water, separating therefrom a gasoline fraction having an arsenic content of less than about 0.015 part per million and less than that of said charge, and reforming said gasoline fraction in the presence of a catalyst comprising alumina and platinum.

4. The process for producing reformed gasoline from an arsenic-containing hydrocarbon charge which comprises treating the charge with ferric oxide in the presence of water, thereby oxidizing the arsenic into a form soluble in water, dissolving the oxidized arsenic compound in water and removing the same from the process, separating a gasoline fraction having an arsenic content of less than about 0.015 part per million and less than that of said charge, and reforming said gasoline fraction in the presence of a catalyst comprising alumina, platinum and combined halogen.

5. The process of producing aromatics from an arsenic-containing hydrocarbon charge which comprises treating the charge with a readily reducible metal oxide to oxidize said arsenic, dissolving the oxidized arsenic compound in water, separating a charge fraction having an impurity content of less than about 0.05 part per million and less than that of said charge, and subjecting said charge fraction to aromatization in the presence of a catalyst comprising alumina and a noble metal.

6. The process of producing aromatics from a naphthenic hydrocarbon charge containing arsenic which comprises treating the charge with ferric oxide in the presence of water, thereby oxidizing the arsenic into a form soluble in water, dissolving the oxidized arsenic compound in water and removing the same from the process, separating a naphthene fraction having an arsenic content of less than about 0.015 part per million and less than that of said charge, and subjecting said fraction to dehydrogenation in the presence of a catalyst containing alumina platinum.

7. A process for removing arsenic from a hydrocarbon material containing the same which comprises treating the hydrocarbon material with ferric oxide and water to oxidize the arsenic to a water-soluble form and to dissolve the oxidized arsenic in the water, and separating a substantially arsenic-free hydrocarbon phase from an aqueous phase containing the dissolved oxidized arsenic.

8. A process for removing arsenic from a hydrocarbon material containing the same which comprises treating the hydrocarbon material with nickelic oxide and water to oxidize the arsenic to a water-soluble form and to dissolve the oxidized arsenic in the water, and separating a substantially arsenic-free hydrocarbon phase from an aqueous phase containing the dissolved oxidized arsenic.

9. A process for removing arsenic from a hydrocarbon material containing the same which comprises treating the hydrocarbon material with cobaltic oxide and water to oxidize the arsenic to a water-soluble form and to dissolve the oxidized arsenic in the water, and separating a substantially arsenic-free hydrocarbon phase from an aqueous phase containing the dissolved oxidized arsenic.

10. A process for removing arsenic from a hydrocarbon material containing the same which comprises treating the hydrocarbon material with cupric oxide and water to oxidize the arsenic to a water-soluble form and to dissolve the oxidized arsenic in the water, and separating a substantially arsenic-free hydrocarbon phase from an aqueous phase containing the dissolved oxidized arsenic.

11. The method of converting an arsenic-containing hydrocarbon charge which comprises treating the charge with a readily reducible metal oxide, thereby oxidizing the arsenic into an oxidized compound soluble in water, dissolving said oxidized compound in water and removing the same from the process, separating a hydrocarbon charge fraction having an arsenic content of less than about 0.05 parts per million and less than that of said charge, and subjecting said hydrocarbon fraction to conversion in the presence of a catalyst comprising platinum.

12. A hydrocarbon process which comprises treating an arsenic-containing hydrocarbon charge with a readily reducible metal oxide in the presence of water, thereby oxidizing said arsenic into a compound soluble in water, dissolving said arsenic compound in the water and removing the same from the process, separating a hydrocarbon charge fraction having an arsenic content of less than about 0.05 parts per million and less than that of said charge, and subjecting said hydrocarbon fraction to conversion in the presence of a catalyst comprising platinum.

References Cited in the file of this patent

UNITED STATES PATENTS

| Number | Name | Date |
|---|---|---|
| 2,042,052 | Hoover | May 26, 1936 |
| 2,338,941 | Howard | Jan. 11, 1944 |
| 2,430,249 | Ruthruff | Nov. 4, 1947 |
| 2,479,110 | Haensel | Aug. 16, 1949 |

OTHER REFERENCES

Lewis et al.: Ind. and Eng. Chem. Anal. Ed., vol. 9, pages 405–406 (1937).

Thomas: "The Science of Petroleum," vol. 11, Oxford University Press, page 1054 (1938).

Berkman: "Catalysis," Reinhold Pub. Co., 1940, pages 393, 395, 402.

"Chemical Refining of Petroleum," Kalichevsky et al., 2nd Edition, page 34 (1942), Reinhold Pub. Co., New York.

Maxted: "Journal of the Society of Chemical Industry," vol. 67, pages 93–97, March 1948.

"Chem. Abstracts," vol. 45, 3698ᵉ, May 10, 1951.